United States Patent [19]
Abramovici

[11] Patent Number: 6,034,538
[45] Date of Patent: Mar. 7, 2000

[54] VIRTUAL LOGIC SYSTEM FOR RECONFIGURABLE HARDWARE

[75] Inventor: Miron Abramovici, Berkely Heights, N.J.

[73] Assignee: Lucent Technologies Inc., Murray Hill, N.J.

[21] Appl. No.: 09/010,000

[22] Filed: Jan. 21, 1998

[51] Int. Cl.$^7$ .................... H03K 19/173; H03K 19/177; G06F 7/38

[52] U.S. Cl. ................ 326/38; 326/40; 326/41; 395/500

[58] Field of Search ................ 326/38, 39, 40, 326/41, 47, 37; 395/500.13–500.18, 500

[56] References Cited

U.S. PATENT DOCUMENTS

| | | |
|---|---|---|
| 4,541,071 | 9/1985 | Ohmori . |
| 4,942,319 | 7/1990 | Pickett et al. ............................ 326/38 |
| 5,493,239 | 2/1996 | Zlotnick .................................. 326/38 |
| 5,508,636 | 4/1996 | Mange et al. ............................ 326/38 |
| 5,572,148 | 11/1996 | Lytle et al. ............................... 326/41 |
| 5,640,106 | 6/1997 | Erickson et al. ......................... 326/38 |
| 5,654,650 | 8/1997 | Gissel ....................................... 326/38 |
| 5,760,607 | 6/1998 | Leeds et al. ............................. 326/38 |
| 5,773,993 | 6/1998 | Trimberger .............................. 326/38 |
| 5,838,165 | 11/1998 | Chatter .................................... 326/38 |

FOREIGN PATENT DOCUMENTS

| | | |
|---|---|---|
| 0 759 662 A2 | 2/1997 | European Pat. Off. . |
| 2 286 737 | 8/1995 | United Kingdom . |
| 2 304 438 | 3/1997 | United Kingdom . |

OTHER PUBLICATIONS

J.H. Mayer, "Reconfigurable computing redefines design flexibility," Computer Design, pp. 49–52, Feb. 1997.
J. Rosenberg, "Implementing Cache Logic™ with FPGAs," Atmel Application Note 0461A, pp. 7–11 to 7–14.
B.K. Fawcett, "Applications of Reconfigurable Logic," in "More FPGAs," W.R. Moore and W. Luk, eds., Abingdon EE & CS Books, Oxford, England, pp. 57–69, 1994.
H. Schmit, "Incremental Reconfiguration for Pipelined Applications, " IEEE Symposium on FPGAs for Custom Computing Machines, pp. 47–55, 1996.
"Atmel FPGA is as Versatile as Madison Square Garden," ASIC Design, p. A21, Dec. 1994.
M. Disman, "FPGAs go on the record," OEM Magazine, pp. 85, 87, Nov. 1996.
K. Kwiat and W. Debany, "Reconfigurable Logic Modeling," Design Automation, http://www.isdmag.com/Editorial/1996/CoverStory9612.html, Dec. 1996.
M.J. Wirthlin and B.L. Hutchings, "A Dynamic Instruction Set Computer," Proceedings of the IEEE Symposium on FPGAs for Custom Computing Machines, Apr. 19–21, 1995, Napa Valley, CA, pp. 99–107, Apr. 1995.

*Primary Examiner*—Michael Tokar
*Assistant Examiner*—Daniel D. Chang

[57] ABSTRACT

A set of reconfigurable hardware includes a number of field programmable gate arrays (FPGAs), a controller referred to as a page manager, and a RAM-based local memory. In an illustrative embodiment, each of the FPGAs is suitable for implementing any one of a number of different portions of a logic circuit. A netlist or other descriptive information characterizing the logic circuit is partitioned into a number of pages, each of the pages corresponding to one of the portions of the circuit. The page manager controls the loading and unloading of the pages from the local memory into the FPGAs of the reconfigurable hardware, and controls storage and transfer of inter-page signals. The page manager is configured to detect "page faults" such as, for example, an unloaded page with a full input buffer. The page manager responds to a given page fault by subsequently loading the previously unloaded page into one of the FPGAs. The page manager may include FIFO input buffers or other suitable sets of registers for storing inter-page signal values for loaded and unloaded pages.

25 Claims, 4 Drawing Sheets

VIRTUAL LOGIC SYSTEM FOR RECONFIGURABLE HARDWARE

FIELD OF THE INVENTION

The present invention relates generally to reconfigurable hardware for use in adaptive computing and other applications, and more particularly to reconfigurable hardware techniques which can permit efficient implementation of logic circuits of any desired size, structure and complexity.

BACKGROUND OF THE INVENTION

Reconfigurable hardware is used in adaptive computing and other applications to implement logic circuit functions. A given set of reconfigurable hardware, which may be based on field programmable gate arrays (FPGAs) or other similar devices, can be reconfigured so as to provide different logic functions at different times, thereby in effect providing the functionality of a complex circuit which would otherwise require substantially more hardware. Reconfigurable hardware based on FPGAs is described in, for example, J. H. Mayer, "Reconfigurable computing redefines design flexibility," Computer Design, pp. 49–52, February 1997; J. Rosenberg, "Implementing Cache Logic™ with FPGAs," Atmel Application Note 0461A, pp. 7–11 to 7–14; and B. K. Fawcett, "Applications of Reconfigurable Logic," in "More FPGAs," W. R. Moore and W. Luk, eds., Abingdon EE & CS Books, Oxford, England, pp. 57–69, 1994; all of which are incorporated by reference herein.

In a typical adaptive computing application, a preprocessing phase is used to produce a circuit model, referred to as a netlist, which is loaded into the reconfigurable hardware such that the hardware provides the functionality of a particular circuit. Unfortunately, conventional reconfigurable hardware platforms often have insufficient capacity to handle the entire netlist for a circuit of even moderate complexity. Although a type of reconfigurable hardware known as an emulator can provide a very large capacity, up to about six million gates, emulators are also very expensive, typically costing on the order of $0.75 per gate, and are therefore impractical for many important applications.

In order to avoid the need for a costly emulator, some applications partition a given circuit into stages, such that a less costly reconfigurable hardware platform may be used to implement each of the stages. FIG. 1 shows an example of such an application. A logic circuit 10 includes three distinct stages 12-1, 12-2 and 12-3 as shown. Each of the stages 12-1, 12-2 and 12-3 of the logic circuit 10 are implemented in turn using the same reconfigurable hardware 14. A partial netlist including information characterizing a given one of the stages is loaded into the reconfigurable hardware 14 in order to permit the hardware to perform processing operations for that stage. In this manner, the reconfigurable hardware 14 is shared by the stages 12-1, 12-2 and 12-3, and periodically reconfigured to provide the particular processing operations required in each of the stages. The technique illustrated in FIG. 1 is suitable for use in applications which can be naturally partitioned into stages, where each stage works with the data prepared by the previous stage, in a manner similar to the stages of a pipeline. See, for example, H. Schmit, "Incremental Reconfiguration for Pipelined Applications," IEEE Symposium on FPGAs for Custom Computing Machines, pp. 47–55, 1996.

Assuming that the logic functions used in each of the stages of a pipelined circuit structure such as that shown in FIG. 1 can be implemented in the available hardware, such an application can reuse the hardware by reconfiguring it for each stage. However, there are a number of problems with this type of approach. For example, partitioning a logic circuit into stages often requires a substantial amount of expensive manual design effort. Moreover, many important applications do not exhibit a pipelined structure which can be partitioned into identifiable stages. Even if a circuit does exhibit a pipelined structure, this structure may not be easy to recognize from a large netlist, or the size of the circuit may be such that no single stage can be accommodated by the available hardware. Current reconfigurable hardware techniques are thus not capable of processing large circuit netlists in an economical manner, and are therefore not readily utilizable in to many important applications.

SUMMARY OF THE INVENTION

The invention provides a virtual logic system for extending the capabilities of reconfigurable hardware. The virtual logic system is based in part on hardware paging that keeps loaded in the reconfigurable hardware only the active parts of a given circuit, while keeping the currently unused parts of the circuit in memory from which they may be downloaded into the reconfigurable hardware as the need arises. Unlike the conventional techniques described above, the virtual logic system of the invention is applicable to any size circuit and any type of synchronous circuit structure, and operates in a substantially user-transparent manner.

In an illustrative embodiment of the invention, a set of reconfigurable hardware includes a number of field programmable gate arrays (FPGAs), a controller referred to herein as a page manager (PAGMAN), and a RAM-based local memory coupled to the FPGAs and the PAGMAN. Each of the FPGAs is suitable for implementing different portions of a logic circuit. An initial netlist characterizing the logic circuit is partitioned into a number of pages, each of the pages corresponding to one of the portions of the circuit. Each of the FPGAs implements the circuit functions of a single one of the pages. The PAGMAN controls the loading and unloading of the pages into the FPGAs of the reconfigurable hardware, and controls storage and transfer of inter-page signals between loaded and unloaded pages. The PAGMAN may include FIFO input buffers or other suitable sets of registers for storing inter-page signal values and controlling inter-page communications. The PAGMAN is configured to detect one or more different types of "page faults," which may result, for example, when an input buffer of an unloaded page becomes full. The PAGMAN may respond to a given page fault by subsequently loading the unloaded page into one of the FPGAs. The FPGAs, PAGMAN and local memory may be implemented on a circuit card connected to a host computer via a bus.

By exploiting run-time reconfiguration, the virtual logic system enables implementation of circuits much larger than the physical capacity of the reconfigurable hardware, while at the same time insulating the user from the underlying hardware and run-time infrastructure. The invention thus makes it economically feasible to utilize reconfigurable hardware in a wide variety of important applications, regardless of circuit size, structure or complexity.

DETAILED DESCRIPTION OF THE INVENTION

Figure 1:
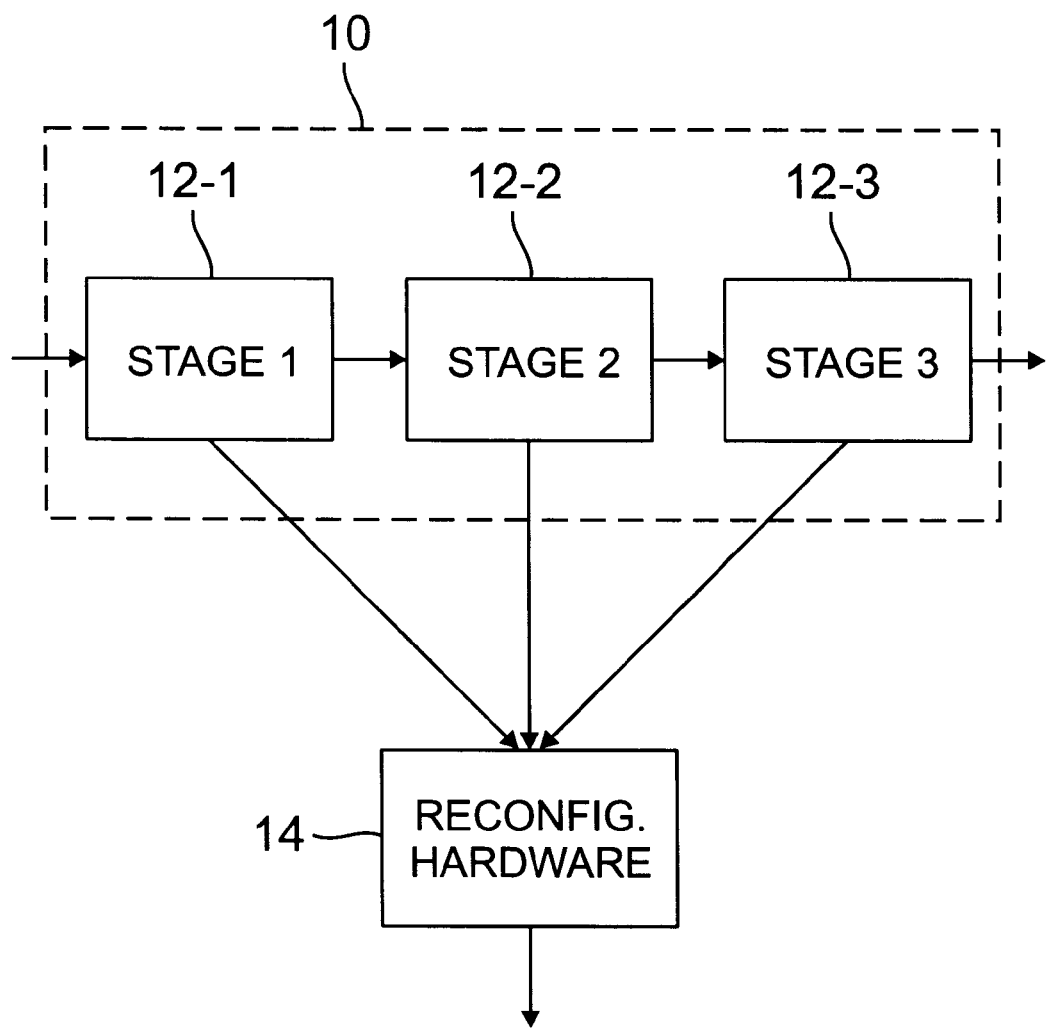
FIG. 1 illustrates a prior art reconfigurable hardware technique suitable for use with a multi-stage pipelined circuit structure.

The following description will illustrate the present invention using an exemplary set of reconfigurable hardware which includes multiple field programmable gate arrays (FPGAs) and is suitable for processing complex logic circuits characterized by very large netlists. It should be understood, however, that the invention is not limited to use with any particular type of reconfigurable hardware. For example, the described techniques are readily applicable to reconfigurable hardware applications based on single FPGAs, as well as to reconfigurable hardware which does not include FPGAs. The term "page" as used herein is intended to include any type of data or other information which characterizes at least a portion of a circuit implemented in reconfigurable hardware. The term "controller" refers to a page manager or other processing device which may be configured to provide at least a portion of a paging function or other virtual logic mechanism. The term "circuit model" is intended to include a netlist or any other type of information which characterizes a circuit.

The invention provides a virtual logic system which permits a given set of reconfigurable hardware to implement a logic circuit having any desired size and any type of synchronous circuit structure, in a substantially user-transparent manner. In the following description, it will be assumed that the logic circuit is characterized by a model, referred to as an initial netlist, which may be arbitrarily large. The netlist may be generated by any of a number of different types of well-known design methods, including but not limited to logic synthesis and schematic capture. The logic circuit netlist is partitioned into a number of disjoint subcircuits, with each of the subcircuits represented by a portion of the initial netlist generally referred to herein as a "page." The partitioning of the logic circuit into subcircuits is thus implemented by partitioning the initial netlist into corresponding pages. Unlike the conventional partitioning of a pipelined structure into multiple stages as described previously, the partitioning of an initial netlist into pages in accordance with the invention does not require any particular functional relationship between the different pages. In order to improve the efficiency of the reconfigurable hardware as applied to a given circuit, a page partitioning algorithm may be used to balance computation and reconfiguration periods in the reconfigurable hardware.

A given subcircuit is implemented in a part of the reconfigurable hardware by loading its corresponding page into the hardware. An "active" page whose subcircuit is implemented in the reconfigurable hardware is thus referred to as a loaded page. Pages which are not currently used are "inactive" and referred to as unloaded pages. Inactive pages may be stored in a local memory associated with the reconfigurable hardware until they are needed. A page manager (PAGMAN), to be described in greater detail below in conjunction with FIG. 2, is used to control the loading and unloading of pages to and from the reconfigurable hardware so as to keep the active pages loaded in the hardware, to keep the inactive pages unloaded and stored in local memory, and to detect and process page faults.

Figure 2:
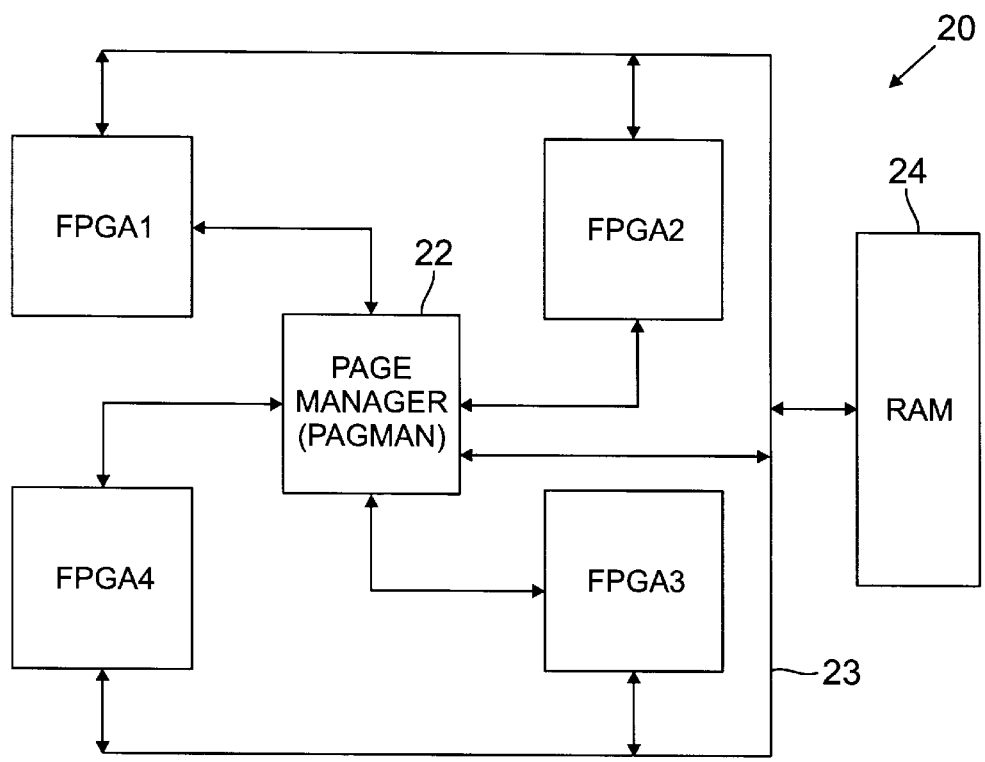
FIG. 2 is a block diagram of a set of reconfigurable hardware with a virtual logic mechanism in accordance with an illustrative embodiment of the invention.

FIG. 2 shows a set of reconfigurable hardware 20 which includes a PAGMAN 22 capable of controlling loading and unloading of pages in the manner described above. In this example, the reconfigurable hardware 20 includes four FPGAs designated FPGA1, FPGA2, FPGA3 and FPGA4. It is assumed for this embodiment that each of the four FPGAs contains one page of a given logic circuit netlist. Each of the four FPGAs communicates over a bus 23 with a local memory 24 which in this embodiment is implemented as a random access memory (RAM). The PAGMAN 22 controls each of the FPGAs, and is also connected to the bus 23 to communicate with the local memory 24. The local memory 24 may include dedicated areas for storing configuration information and register values for each of the pages. The local memory 24 in this embodiment is shared by each of the four FPGAs, such that the same page may be loaded in different FPGAs at different times. Although not a requirement of the invention, it is assumed for the exemplary embodiment of FIG. 2 that the pages are roughly of the same size in terms of FPGA resources. At different times during operation, the same FPGA may contain different pages of the original circuit netlist.

Because the computation process proceeds only for the currently loaded pages, the PAGMAN 22 may keep track of timing information such as a "local time" for every page. The local time of a page corresponding to a given synchronous subcircuit refers generally to the number of clock cycles that have elapsed since the start of operations for that page in the reconfigurable hardware. Eventually the local times of all pages will be substantially the same, but during initial operations these local times may be allowed to get "out-of-sync," such that, for example, the local times advance only for the loaded pages. To ensure proper operation, no page should be permitted to start computation for a given time t, before all of its input data for time t become available.

The multi-FPGA reconfigurable hardware 20 of FIG. 2 may be implemented on a single co-processor circuit board which is attached to a host computer over a bus, such as the peripheral component interconnect (PCI) bus. The FPGAs may be commercially-available FPGAs such as those available from Atmel Corporation of San Jose, Calif. and described in the above-cited Application Note. Other suitable FPGAs are commercially available from Altera of San Jose, Calif., Lattice Semiconductor of Hillsboro, Oreg., Lucent Technologies of Allentown, Pa., Motorola of Chandler, Ariz. and Xilinx of San Jose, Calif. Many alternative configurations may also be used. For example, the reconfigurable hardware 20 may be configured to operate with a single FPGA, or with various types of non-FPGA hardware. In addition, the reconfigurable hardware may be implemented as a stand-alone computer or other processing device, rather than on a circuit board attached to a host computer.

The local memory 24 in system 20 may be RAM in a host computer, a dedicated RAM in the reconfigurable hardware, or combinations of both. It should be noted that the size of the local memory 24 in the exemplary embodiment of FIG. 2 limits the number of pages which can be stored and thus the size of the logic circuit which can be processed. Although other types of storage may be used in a given application to increase the number of pages which may be processed in the reconfigurable hardware 20, including disk-based storage, the storage and retrieval of pages from such devices may slow down the operation of the hardware.

RAM-based local memory is therefore generally preferred in applications in which the processing speed is important.

The PAGMAN 22 controls the loading and unloading of pages for each of the four FPGAs in the reconfigurable hardware 20. It stores information regarding which page is loaded in which of the FPGAs at any given time, and also stores a mapping of pages and their locations in the local memory 24. The PAGMAN 22 is also operative to route signals between loaded pages, and to detect page faults. In accordance with the invention, the PAGMAN 22 may include one or more first-in first-out (FIFO) buffers for use in controlling storage and transfer of inter-page signal values. The use of FIFO buffers allows the PAGMAN to accumulate a number of signal values before a given page is made active, such that when the page configuration is downloaded it will be able to perform useful functions more quickly than would otherwise be possible. Such an implementation tends to reduce imbalance between the time spent downloading a page configuration to an FPGA and the computation time in the FPGA after the page configuration has been downloaded.

Figure 3:
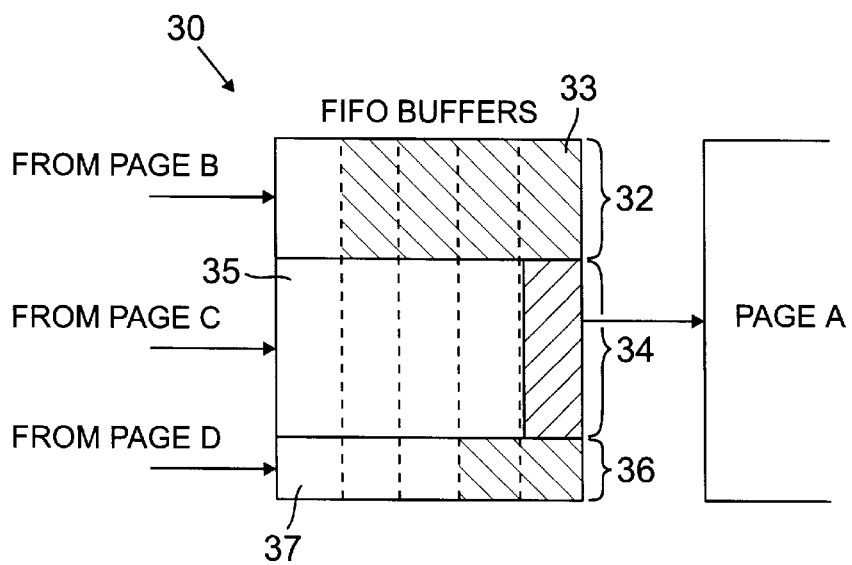
FIG. 3 illustrates the operation of first-in first-out (FIFO) buffers in an exemplary page manager (PAGMAN) suitable for use in the reconfigurable hardware of FIG. 2.

FIG. 3 illustrates a portion of an exemplary FIFO input buffer 30 which may be included within the PAGMAN 22 for a page A. As previously noted, the PAGMAN 22 attempts to balance reconfiguration and computation times. This means that a loaded page should perform as much computation as possible before it is unloaded to make room for another page. To do this, input data vectors for page A are buffered as illustrated in FIG. 3. Different "slices" or portions of the data vectors for page A, generated by pages B, C, and D, possibly at different times, are synchronized and accumulated in parallel FIFO buffers. The portion of buffer 30 shown in FIG. 3 includes three sets of parallel FIFO buffers 32, 34 and 36, for holding data vectors generated by pages B, C and D, respectively. Each of the sets 32, 34 and 36 includes a number of individual slice buffers 33, 35 and 37, respectively. In the example shown, the computation of data vectors by page C temporarily lags behind that of pages B and D, as indicated by the relative fullness of the corresponding buffer sets. Ideally, A should be loaded only after its input buffer 30 becomes full. This may be viewed as a type of generalized data-flow model, in which an operand required for page A corresponds to a vector slice generated by page B, C, or D, and the computation waits for the operands computed in the last k clock cycles, where k is the number of buffers in each of the sets 32, 34 and 36. The PAGMAN 22 may maintain an input buffer similar to that shown in FIG. 3 for each of the pages of a given circuit. Other types of inter-page buffering may be used in alternative embodiments of the invention.

Figure 4:
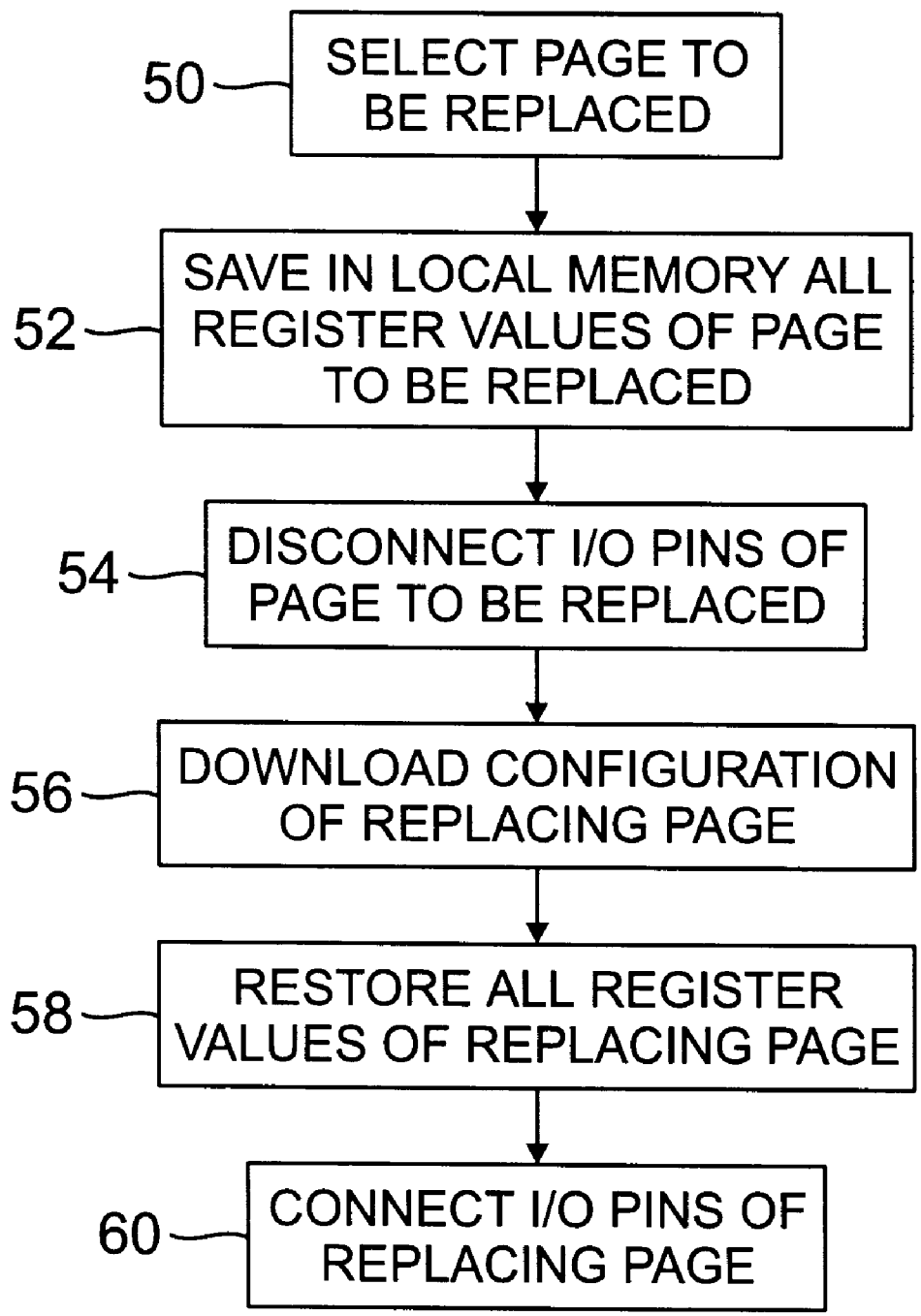
FIG. 4 is a flow diagram illustrating exemplary page fault processing operations which may be implemented in a PAGMAN in accordance with the invention.

FIG. 4 is a flow diagram of page fault processing operations which may be implemented in the PAGMAN 22 of FIG. 2. Upon detection of a page fault indicating, for example, that an input buffer of an unloaded page has become full, the PAGMAN 22 in step 50 selects a page to be replaced in order to remedy the page fault. The selected page may be, for example, the least recently loaded page, or a page selected using another preestablished rule. Alternatively, a page replacement algorithm may be used to select a replacement page so as to minimize certain criteria. The PAGMAN 22 then in step 52 saves in the local memory 24 all of the register values associated with the selected page to be replaced. In step 54, the PAGMAN 22 directs the disconnection of all input/output (I/O) pins in the FPGA associated with the page to be replaced. The configuration information of the "new" or replacing page is then downloaded in step 56 by the PAGMAN 22 from the local memory 24 into the FPGA occupied by the page to be replaced. The register values of the replacing page are retrieved from local memory 24 and restored in step 58. Finally, the FPGA I/O pins associated with the replacing page are connected in step 60. This establishes the required connections from the replacing page input buffer to the corresponding inputs of the FPGA into which the replacing page was loaded, and from the outputs of that FPGA to the input buffers of the pages fed by the replacing page.

A given page loaded in the manner described above will process its next input vector as soon as all of the slices of that vector have arrived in the input buffer of the loaded page. The PAGMAN 22 may use the status of the page input buffers to determine the next page to swap out so that the flow of computation can proceed. For example, a page which "feeds" at least one already-full input buffer may be unloaded because there will be no storage available for its next output vector. If no page input buffer is completely full, the next page to swap in may be selected as the one whose input buffer has the largest number of vectors to process.

The PAGMAN 22 may be implemented using a microprocessor, an FPGA, a combination of a microprocessor and an FPGA, a combination of an FPGA and a field-programmable interconnect chip (FPIC), or any other arrangement of hardware, software, firmware or combinations thereof suitable for providing the page management functions described above in conjunction with FIGS. 2 through 4.

Figure 5A:
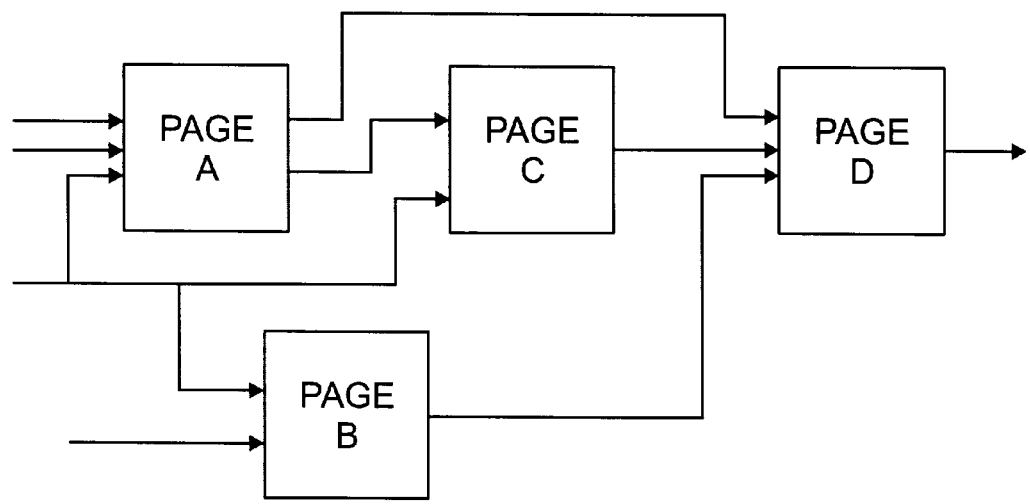
FIGS. 5A and 5B illustrate page partitioning aspects of the invention.

The partitioning of a netlist or other circuit representation into pages will now be described in greater detail. FIG. 5A is a block diagram illustrating a page configuration for a circuit which includes a feed-forward structure. The interconnections between the four exemplary pages A, B, C and D in the feed-forward structure of FIG. 5A therefore do not include any feedback loops, although the internal structure of a given page may include one or more feedback loops. The pipelined structure described previously is a particular type of feed-forward structure. A page which is fed only by primary inputs (PIs) will be referred to as an independent page, while a page which requires data computed by one or more other pages will be referred to as a dependent page. In the FIG. 5A example, pages A and B are independent pages, and pages C and D are dependent pages. Independent pages may buffer an arbitrarily large number of input data vectors.

A concept referred to herein as "page level" is defined recursively as follows. A page fed only by PIs is said to have level 0. The level of any other page X is one greater than the maximum level among the pages that feed X. In FIG. 5A, the level of pages A and B is 0, the level of page C is 0+1=1, and the level of page D is 1+1=2. This page level information can be used by the PAGMAN 22 to schedule pages for loading in the available FPGAs. For example, assuming that in an illustrative embodiment only two pages can be loaded at a time, the PAGMAN 22 will first load the level-0 pages, i.e., pages A and B, and initiate computation for these two pages with input data vectors buffered from the PIs. Pages A and B then store their output data vectors in the input buffers of pages C and D.

When the input buffer of page C becomes full, the PAGMAN 22 recognizes a page fault. Then one of the level-0 pages, say A, will be unloaded from its FPGA, and page C (which has level 1) will be loaded into that FPGA. Page C then starts processing the data from its input buffer and stores its results in the input buffer of page D. Concurrently with this activity, the configuration and the register values needed for page D (which has level 2) are being loaded into the FPGA previously used by page B. As soon as page D is loaded, it starts processing data from its input buffer. As soon as page C empties its input buffer, the FPGA used for page C is reallocated to page A. Now the loading process for page A is concurrent with the operation of page D. Page A can start processing input data vectors as soon as its loading process is complete.

A page partitioner in accordance with the invention may attempt to minimize inter-page logic activity, such that pages are as "self-contained" or autonomous as possible. The more autonomous a page is, the more computation it will be able to perform with the data accumulated in its input buffer before it may need more data produced by other pages. One particular objective of the partitioner may therefore be to keep feedback loops inside pages. Depending on the size of a given FPGA, this goal may not be achieved in every circuit.

Figure 5B:
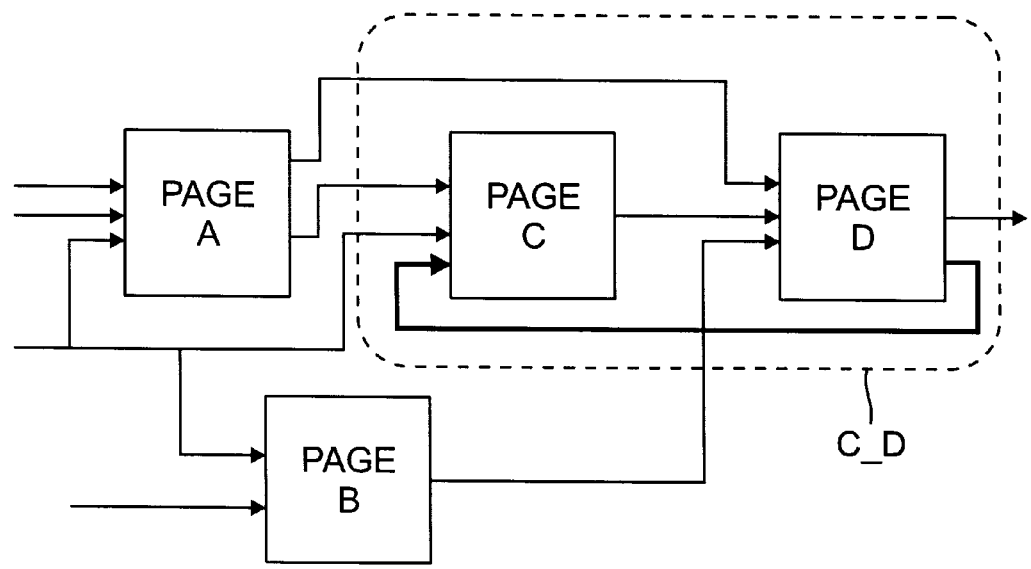

FIG. 5B shows the page interconnections of FIG. 5A with the addition of a feedback loop from an output of page D to an input of page C. Because of the feedback loop, page levels cannot be computed for pages C and D using the above-described procedure. An "undefined" page level will therefore be used to identify the feedback loops. It will be assumed that pages C and D could not be grouped together in the same page due to size restrictions in the FPGAs. One possible way of dealing with the inter-page feedback loop in FIG. 5B is to treat pages C and D as a superpage C_D that is required to fit into two adjacent FPGAs. Implementing this concept will generally require appropriate changes in the PAGMAN 22. Of course, the existence of a global feedback loop would require that the entire circuit be treated as a superpage, which would be too large to fit in the available reconfigurable hardware. The problem with such a circuit is that only a few vectors will be able to be buffered before a new reconfiguration will be required. This problem may be alleviated through the use of, for example, extended look-ahead to download configurations before they are needed, and caching techniques to allow reproducing of learned page activity without emulating the page in the reconfigurable hardware.

The invention provides reconfigurable hardware techniques which are applicable to any synchronous circuit structure, which can process any size circuit, and which operate in a manner which is transparent to the user. The invention thus effectively removes the "pipeline-only" structural limitation imposed by the previously-described conventional techniques. It can also ensure that users need not be concerned with how their circuit will be executed, emulated or simulated on the reconfigurable hardware, or with a possible mismatch between the size of their circuit and the available hardware capacity. In other words, a virtual logic system in accordance with the invention insulates the user from the underlying hardware and run-time infrastructure, so that the user will be able to focus on the intended application, and not on the logistics of running the design.

The above-described embodiments of the invention are intended to be illustrative only. Alternative embodiments may be configured which utilize other types of reconfigurable hardware and paging control mechanisms. The invention may be scaled to accommodate any desired circuit size by, for example, increasing the size of the local memory 24 and the number and size of FPGAs. In addition, the FPGAs may be configured to include an embedded memory for use as emulated memory for a given circuit. Other embodiments of the invention can be configured to provide support for incremental run-time reconfiguration features. These and numerous other alternative embodiments within the scope of the following claims will be apparent to those skilled in the art.

What is claimed is:

1. A method of reconfiguring a set of hardware to implement different portions of a circuit, the method comprising the steps of:

partitioning a model of the circuit into a plurality of pages, each of the pages corresponding to one of the portions of the circuit; and controlling sequential loading of the pages from a memory into the hardware, such that detection of a condition relating to an unloaded page triggers a subsequent loading of the unloaded page.

2. The method of claim 1 wherein the condition relating to the unloaded page corresponds to an indication that an input buffer associated with the unloaded page is substantially full.

3. The method of claim 1 wherein the controlling step includes the step of storing inter-page signal values in first-in first-out buffers associated with the pages.

4. The method of claim 1 wherein the reconfigurable hardware includes a plurality of field programmable gate arrays, and the controlling step includes the step of controlling the loading of the pages such that a subset of the pages are loaded into the field programmable gate arrays.

5. The method of claim 4 wherein the controlling step includes controlling the loading of the pages such that a given page is loaded into different ones of the field programmable gate arrays at different times.

6. The method of claim 1 wherein the controlling step includes establishing a connection between a first page loaded into a first part of the reconfigurable hardware and an input buffer associated with a second page.

7. The method of claim 1 wherein the controlling step includes the steps of:

selecting a currently-loaded page to be replaced;

directing the disconnection of input and output lines in a portion of the reconfigurable hardware associated with the page to be replaced;

loading another page into the portion of the reconfigurable hardware;

retrieving previously-stored inter-page signal values associated with the other page; and directing the connection of input and output lines associated with the other page.

8. A reconfigurable hardware apparatus comprising:

a plurality of reconfigurable devices, each capable of independently implementing a different portion of a circuit, wherein the circuit is characterized by a model partitioned into a plurality of pages, each of the pages corresponding to one of the portions of the circuit; and a controller coupled to the reconfigurable devices, wherein the controller is operative to control loading of the pages into the devices, such that detection of a condition relating to an unloaded page triggers a subsequent loading of the unloaded page.

9. The apparatus of claim 8 wherein the condition relating to the unloaded page corresponds to an indication that an input buffer associated with the unloaded page is substantially full.

10. The apparatus of claim 8 further including a local memory coupled to the reconfigurable devices and the controller.

11. The apparatus of claim 8 wherein the controller is further operative to store inter-page signal values in first-in first-out buffers associated with the pages.

12. The apparatus of claim 8 wherein the reconfigurable devices are field programmable gate arrays, and the controller is further operative to control the loading of the pages such that a subset of the pages are loaded into the field programmable gate arrays.

13. The apparatus of claim 12 wherein the controller is further operative to control the loading of the pages such that a given page is loaded into different ones of the field programmable gate arrays at different times.

14. The apparatus of claim 8 wherein the controller is further operative to establish a connection between a first page loaded into a first one of the reconfigurable devices and an input buffer associated with a second page.

15. The apparatus of claim 8 wherein the controller and at least a subset of the reconfigurable devices are implemented on a circuit card connected to a host computer over a bus.

16. The apparatus of claim 8 wherein the controller is implemented at least in part using resources of a personal computer.

17. An apparatus for reconfiguring a set of hardware to implement different portions of a circuit, the apparatus comprising:

means for partitioning a model of the circuit into a plurality of pages, each of the pages corresponding to one of the portions of the circuit; and means for controlling loading of the pages from a memory into the hardware, wherein one or more inter-page signal values directed from a given loaded page to an unloaded page are stored so as to be available for use when the unloaded page is subsequently loaded.

18. An apparatus for reconfiguring a set of hardware to implement different portions of a circuit, the apparatus comprising:

means for partitioning a model of the circuit into a plurality of pages, each of the pages corresponding to one of the portions of the circuit; and means for controlling sequential loading of the pages from a memory into the hardware, such that detection of a condition relating to an unloaded page triggers a subsequent loading of the unloaded page.

19. A reconfigurable hardware apparatus comprising:

means for implementing different portions of a circuit using reconfigurable hardware, wherein the circuit is characterized by a plurality of pages, each of the pages corresponding to one of the portions of the circuit; and means for controlling loading of the pages into the reconfigurable hardware, wherein one or more inter-page signal values directed from a given loaded page to an unloaded page are stored so as to be available for use when the unloaded page is subsequently loaded.

20. A reconfigurable hardware apparatus comprising:

means for implementing different portions of a circuit using reconfigurable hardware, wherein the circuit is characterized by a plurality of pages, each of the pages corresponding to one of the portions of the circuit; and means for controlling sequential loading of the pages into the reconfigurable hardware, such that detection of a condition relating to an unloaded page triggers a subsequent loading of the unloaded page.

21. A method of reconfiguring a set of hardware to implement different portions of a circuit, the method comprising the steps of:

utilizing a plurality of reconfigurable devices to implement different portions of a circuit, wherein the circuit is characterized by a plurality of pages, with each of the pages corresponding to one of the portions of the circuit; and controlling loading of the pages into the reconfigurable devices, such that one or more inter-page signal values directed from a given loaded page to an unloaded page are stored so as to be available for use when the unloaded page is subsequently loaded.

22. A method of reconfiguring a set of hardware to implement different portions of a circuit, the method comprising the steps of:

utilizing a plurality of reconfigurable devices to implement different portions of a circuit, wherein the circuit is characterized by a plurality of pages, each of the pages corresponding to one of the portions of the circuit; and controlling sequential loading of the pages into the reconfigurable devices, such that an inter-page signal directed from a loaded page to an unloaded page is stored at least temporarily until a subsequent loading of the unloaded page.

23. An apparatus for implementing a circuit in reconfigurable hardware, comprising:

a circuit partitioner that partitions the circuit into non-pipelinable pages that can be implemented by said reconfigurable hardware; and a memory for communicating results between a currently implemented one of said non-pipelinable pages and another of said non-pipelinable pages.

24. An apparatus for implementing a circuit in reconfigurable hardware, said circuit being partitioned into pages and a maximum size page of said pages being implementable on said reconfigurable hardware, said apparatus comprising:

a page manager for controllably supplying said pages into said reconfigurable hardware in an arbitrary order, wherein said page manager swaps said pages so as to implement said circuit; and a memory for communicating results between a currently implemented one said pages and another of said pages.

25. A reconfigurable hardware apparatus comprising:

a plurality of reconfigurable devices, each capable of independently implementing a different portion of a circuit, wherein the circuit is characterized by a model partitioned into a plurality of pages, each of the pages corresponding to one of the portions of the circuit; and a controller coupled to the reconfigurable devices, wherein the controller is operative to control loading of the pages into the devices, such that one or more inter-page signal values directed from a given loaded page to an unloaded page are stored so as to be available for use when the unloaded page is subsequently loaded.

* * * * *